United States Patent [19]
Sano et al.

[11] Patent Number: 5,931,992
[45] Date of Patent: Aug. 3, 1999

[54] SURFACE-DECORATED ARTICLES BY NOBLE METALS UTILIZABLE IN AN ELECTRONIC RANGE METHOD FOR PRODUCING SAME AND LIQUID GOLD FOR INSULATING OVERGLAZE DECORATION

[75] Inventors: Masato Sano, Nagoya; Ryuta Yokoyama, Aichi-ken, both of Japan

[73] Assignee: Noritake Co., Ltd., Aichi-ken, Japan

[21] Appl. No.: 09/074,055

[22] Filed: May 7, 1998

Related U.S. Application Data

[62] Division of application No. 08/578,117, Dec. 27, 1995, Pat. No. 5,783,310.

[30] Foreign Application Priority Data

Dec. 27, 1994 [JP] Japan ..................................... 6-339122

[51] Int. Cl.⁶ ...................................................... B22F 7/00
[52] U.S. Cl. ...................... 106/1.18; 106/1.19; 106/1.21
[58] Field of Search ................................. 106/1.18, 1.19, 106/1.21

[56] References Cited

U.S. PATENT DOCUMENTS

| 4,748,071 | 5/1988 | Wild ........................................ 428/434 |
| 5,032,429 | 7/1991 | Diefenbach ............................. 428/702 |

FOREIGN PATENT DOCUMENTS

| 594151 | 2/1934 | Germany . |
| 693751 | 6/1940 | Germany . |
| 12 33 769 | 2/1967 | Germany . |
| 3524912 | 11/1986 | Germany . |
| 3616547 | 9/1987 | Germany . |
| 37 36 583 | 11/1988 | Germany . |
| 53-18611 | 2/1978 | Japan . |
| 55-51776 | 4/1980 | Japan . |
| 55-56079 | 4/1980 | Japan . |
| 56-96748 | 8/1981 | Japan . |
| 2-36558 | 8/1990 | Japan . |
| 5-13113 | 2/1993 | Japan . |
| 6-48779 | 5/1994 | Japan . |

OTHER PUBLICATIONS

Chemical Abstracts, vol. 89, No. 14, Oct. 2, 1978, Columbus, Ohio, U.S.; Abstract No. 116697z.

*Primary Examiner*—Timothy M. Speer
*Attorney, Agent, or Firm*—Morrison & Foerster LLP

[57] ABSTRACT

A surface-decorated article by noble metal having a decorating matter of noble metal fused to the surface of a ceramic article. The decorating matter has a dual layer structure of a frit layer and an insulating noble metal film layer, which film layer comprising golden components of 60–90% Au, 3–15% Si, 2–11% In and 2–14% Ca. The noble metal decorating matter is not damaged on exposure to an electronic range, superior in chemical stability and abrasion resistance.

4 Claims, No Drawings

SURFACE-DECORATED ARTICLES BY NOBLE METALS UTILIZABLE IN AN ELECTRONIC RANGE METHOD FOR PRODUCING SAME AND LIQUID GOLD FOR INSULATING OVERGLAZE DECORATION

This application is a division of U.S. Ser. No. 08/578,117, filed Dec. 27, 1995, now U.S. Pat. No. 5,783,310.

BACKGROUND

1. Field of the Invention

This invention relates to a surface-decorated article having on its surface a golden or silvery noble metal decorating matter which is not damaged on being exposed to high-frequency electro-magnetic waves radiated by an electronic range, and a method for preparing the surface-decorated article. The invention also relates to a liquid gold for overglaze decoration employed therefor.

2. Related Art

In the following, discussions on the related art will be first presented briefly.

Among ceramic articles, such as porcelain, china wares, earthen wares or pottery (termed herein commulatively as "ceramic wares"); glass ware or enamel ware, there are such articles having beautiful golden or silvery decorative matter on its surface for giving elegant or gorgeous impression.

The conventional surface-decorated articles by noble metal are prepared by coating liquid gold containing organic compounds of noble metal represented by cold resin balsam sulfide on the article surface by brushing, straying or with the aid of printing paper etc. and subsequently baking the article for adhesion.

However, when the surface-decorated articles thus produced are heated by an electronic range, sparks are generated on the surface of the noble metal decorating matter thus possibly damaging the decorating matter by cracking or peeling off.

This is ascribable to the fact that the nobel metal compound of the noble metal decorating matter is electrically conductive.

Thus, investigations in electrically non-conductive noble metal decorating matter, not producing damages during use in the electronic range, are recently under progress.

For example, in JP Patent kokai Publications JP-A-55-51776 (1980) and JP-A-55-56079 (1980), frits free of lead or containing only a minor quantity of lead are contained along with the golden components. It is stated therein that the respective noble metal particles are sheathed by frits contained in the composition and attain a vitrified state by fusion of the frits brought about by firing thus assuring superior abrasion resistance and resistance against chemicals, in addition to resistance against electricity.

On the other hand, there is disclosed in JP Patent Kokoku Publications JP-B-2-36558 (1990) and JP-B-5-13113 (1993) a liquid gold or paste gold for overglaze decoration, containing organic compounds of bismuth, indium and silicon. It is stated therein that the noble metal decorating matter, that is gold alloy, prepared by employing the noble metal for overglaze decoration, becomes electrically non-conductive by the above composition.

In addition, in JP Patent Kokai Publication JP-A-6-48779 (1994), there is contained barium in addition to the above-mentioned components of rendering the gold alloy electrically non-conductive for improving gold or silver color-developing characteristics.

However, the above-described conventional ceramic articles, such as ceramic wares, glassware or enamelware, having coated thereon a golden or silvery noble metal decorating matter for use on an electronic range, are rendered insulating by adding insulating inorganic components in the noble metal for overglaze decoration in the form of organic compounds or frits for prohibiting sparking even when the articles are employed in the electronic range.

SUMMARY OF THE DISCLOSURE

According to the eager investigations by the present inventors, however, the following problem has been encountered in the related art. Namely, the noble metal decorating matter in the surface decorated ceramic articles are of a single noble metal film structure and becomes electrically conductive upon being polished on its surface with, e.g., an abrasive paper, and it is locally heated and damaged by thermal shock when subsequently placed in an electronic range. On the other hand, when the ceramic articles are immersed in a boiling alkaline solution, insulating components in the noble metal film are dissolved in the alkali solution thus leading to loss of the insulating properties. Thus, when the articles are subsequently employed in an electronic range, sparking is produced.

In other words, if the surface-decorated articles are repeatedly washed using a hard brush (pot cleaner) or abrasives or automatic utensil cleaner with a strongly alkaline detergent, the insulating properties of the noble metal film are lost, such that, if the article is used in an electronic range, sparking or destruction of the decorating matter is produced.

It is therefore an object of the present invention to provide a surface-decorated (ceramic) article by noble metal having an electrically insulating noble metal decorating matter formed thereon, and a method for producing the same, in which the electrical insulating properties of the article are not destructed by immersion in an alkaline solution or by mechanical damages, that is in which the electrical insulating properties of the noble metal decorating matter can be maintained despite prolonged use of the surface-decorated article.

It is therefore another object of the present invention to provide a liquid gold for overglaze decoration for decoration with golden or silvery decoration which is conveniently employed in the above production method for the surface-decorated article for forming an electrically insulating noble metal film exhibiting beautiful coloration.

Further objects will become apparent in the entire disclosure.

As a result of our eager researches, the present inventors have found that, by forming a frit layer, either free of lead or a lead-containing frit layer, on the electrically insulating noble metal film of the golden or silvery color tone for producing a noble metal decorating matter exhibiting mechanical or chemical resistance for use in the electronic range. This finding has led to the completion of the present invention.

In one aspect, the present invention is directed to a surface-decorated article by noble metal comprised of a decorating matter of a noble metal color fused on a ceramic article, wherein the decorating matter has a dual-layer structure of an insulating noble metal film layer and a frit layer (first aspect).

According to a second aspect, there are provided with methods for preparing the surface decorated article.

(A) The surface-decorated article is produced by a method having the steps of (a) applying a required decorative display (pattern) on the surface of the ceramic article using an insulating liquid noble metal (composition) for insulating overglaze decoration, and sintering the article thus having the decorative display thereon, and (b) forming a frit layer on the surface of the decorative display and sintering the article thus having the decorative display and the frit layer. This is so-called two-staged firing method (2nd aspect-A).

(B) Alternatively, the surface-decorated article is produced by a method having the steps of (a) applying a required decorative display on the surface of the ceramic article using an insulating liquid noble metal (composition) for insulating overglaze decoration, (b) forming a frit layer on the surface of the decorative display, and (c) sintering the article thus having the decorative display and the frit layer. This is so-called one-staged firing method (2nd aspect-B).

In the surface-decorated article and the production method therefor, according to the present invention, the thickness of the frit layer is, preferably, not more than 50 $\mu$m and at least 0.1 $\mu$m.

The frit layer has preferably a composition comprised of 0 to 9 wt % of $Na_2O$, 0 to 10.5. wt % of $K_2O$, 0 to 10.5 wt % of $Li_2O$, 0 to 9 wt % of CaO, 0 to 3 wt % of MgO, 10 to 18 wt % of $Al_2O_3$, 8 to 20 wt % of $B_2O_3$, 54 to 62 wt % of $SiO_2$, 0 to 2 wt % of $ZrO_2$ and 0 to 3 wt % of $P_2O_5$, on the proviso that the sum of the amounts of $Na_2O$, $K_2O$ and CaO is not less than 6 wt % and the sum of the total amounts is 100 wt %. The frit layer may also be comprised of not more than 20 parts by weight of PbO relative to 100 parts by weight of the frit composition.

Further, a third aspect of the present invention is directed to a liquid gold for insulating overglaze decoration which may be conveniently employed in the preparation of the surface-decorated article.

That is, in the third aspect, the present invention provides a liquid gold for insulating overglaze decoration for golden decoration presenting a gold color tone upon firing. The liquid gold is comprised essentially of golden components having a metal composition of 60 to 90 wt % of Au, 3 to 15 wt % of Si, 2 to 11 wt % of In and 2 to 14 wt % of Ca, with the total amount being 100 wt %, and a slurry forming liquid (3rd aspect-A).

Preferably, the liquid gold for insulating overglaze decoration further contains at least one of metals selected from the group consisting of 0.1 t 2 parts by weight of Rh and 1 to 10 parts by weight of Bi relative to 100 parts by weight of the golden components.

The present invention also provides a liquid gold for insulating overglaze decoration presenting a silvery color tone upon firing. In this regard, the liquid gold further contains, as silvery components in the liquid gold for overglaze decoration, 0.5 to 5 parts by weight in total of at least one metal selected from the group consisting of Ag, Pt and Pd as the silvery component relative to 100 parts by weight of the golden component (3rd aspect-B).

The insulating noble metal film formed by employing the liquid gold for insulating overglaze decoration may be most desirably employed for the lower layer of the noble metal colored dual-layer decorating matter for the surface-decorated article of the present invention.

DESCRIPTION OF THE PREFERRED EMBODIMENTS

In the following the preferred embodiments will be explained in more detail along with the functions and meritorious effects.

It should be noted that any numerical range disclosed herein represents all and any intermediate values and not limited to the lower and upper ends thereof.

With the conventional noble metal decorating matter formed by only one layer of noble metal formed by noble metal for insulating overglaze decoration, electrical conductivity is frequently developed by grinding by an abrasive paper or immersion in a boiling alkaline solution. That is, if the decorating matter is used for a prolonged period of time, it is likely to be rendered electrically conductive such that sparking tends to be produced in an electronic range. Even if sparking is not produced, the decorating matter, thus rendered electrically conductive, tends to be locally heated and destroyed.

According to the producing method of the present invention and the surface-decorated articles produced by the producing method, the noble metal decorating matter is of a dual structure of the insulating noble metal film and the frit layer, whereby mechanical and chemical stability is afforded to the decorating mater without impairing the color tone of the noble metal film of the lower layer.

It is indispensable for the frit layer making up the noble metal decorating matter according to the present invention, to keep up (not adversely affect) the color tone of the underlying noble metal film layer, so that transparency represents an essential requirement. For protecting the noble metal film layer, the frit layer needs to be resistant against mechanical abrasion or against chemicals such as boiling alkaline solutions. In this sense, the frit layer needs to be a uniform and dense layer.

In addition, for forming a frit layer, it needs to be fired at a temperature not higher than the melting or softening temperature of the substrate body (body to be decorated) of the ceramic article or glaze. Thus it is necessary to prepare the composition of the frit solution so that its softening temperature is on the order of 450 to 600° C. for glass, on the order of 700 to 900° C. for ceramic wares and on the order of 750 to 850° C. for enamel wares.

In addition, it is crucial for prohibiting defects such as hair cracks (microcracks) etc., from occurring to select the composition of the frit having a coefficient of thermal expansion close to that of the body to be decorated. In addition to the thermal expansion coefficient, elasticity and tensile strength of the frit layer would also take part for achieving this objective.

In view of the foregoing, the frit layer of the present invention has such a composition mainly composed of glass-forming oxides, such as $SiO_2$, $B_2O_3$ and $Al_2O_3$, and occasionally containing alkali metal compounds and alkaline earth metal compounds. If PbO is added, the noble metal color is obtained which is excellent in luster, color tone and light transmittance.

The noble metal decorating matter according to the present invention would become electrically conductive, if the noble metal film layer be electrically conductive and the frit layer be of reduced thickness. If the frit layer is of a thickness to inhibit current conduction, the frit layer cannot withstand the high electrical voltage, such that pinholes tend to be produced and the electrically conductive noble metal film layer tends to be damaged by sparking. Conversely, if the frit layer is thickened so that complete absence cf current conduction is achieved, the color tone of he none metal film layer is lost. Thus the underlying noble metal film layer needs to exhibit electrical insulating properties.

In case where the frit layer is formed on the golden or silvery insulating layer, but there is a pinhole in the frit layer, electrical conductive properties tend to be developed due to loading such as immersion in the alkaline solution, thus leading to the risk of sparking. Thus it is necessary to cover the surface of the insulating noble metal film layer in its entirety.

For a similar reason, the frit layer desirably has a certain thickness. However, if the frit layer is too thick, the color tone proper to the underlying noble metal film is impaired. Thus the thickness of the frit layer of the present invention is preferably at least 0.1 μm and not larger than 50 μm and more preferably not less than 10 μm and not larger than 35 μm.

For producing the surface-decorated article of the present invention, the noble metal for overglaze decoration, such as generally black-colored liquid gold or paste gold for overglaze decoration is applied by, e.g., brushing, spraying or with the aid of a printing paper on the surface of a ceramic article, such as glass, ceramic wares or enamel wares, and fired approximately at 500 to 900° C. for forming the noble metal film.

The frit layer is then coated by brushing a frit solution on the entire surface of the noble metal film. Alternatively, the frit solution in the form of a paste is applied directly by printing or with the aid of printing paper for forming the frit layer. The firing (baking) is carried out in general at a temperature of 500 to 900° C.

If defects such as pinholes are produced in the noble metal film layer or in the frit layer by firing, the noble metal or the frit solution for insulating overglaze decoration may be applied on the defective portion using the same coating method as described above for repairing the defective portion.

Alternatively, the following steps may be employed. Namely, the coating of the noble metal for overglaze decoration may be subjected to drying and subsequently forming of a frit layer, whereafter the two layers may be fired simultaneously. In this case, attention should be exercised so that the organic compounds of the respective components constituting the noble metal film layer be completely burned off before the firing temperature reaches the temperature at which the frit layer becomes dense. To this end, it is necessary to employ an organic compound having a low decomposition end temperature or to raise the softening temperature of the frit.

As for the frit layer of the noble metal decorating matter, the following composition is preferred, i.e., a composition comprised of 0 to 9 wt % of $Na_2O$, 0 to 10.5 wt % of $K_2O$, 0 to 10.5 wt % of $Li_2O$, 0 to 9 wt % of CaO, 0 to 3 wt % of MgO, 10 to 18 wt % (further 5 to 18 wt %) of $Al_2O_3$, 8 to 20 wt % of $B_2O_3$, 54 to 62 wt % of $SiO_2$, 0 to 2 wt % of $ZrO_2$ and 0 to 3 wt % of $P_2O_5$, on the proviso that the sum of the amounts of $Na_2O$, $K_2O$ and CaO is not less than 6 wt % and the sum of the total amounts is 100 wt %, for affording resistance to and not impairing coloration of the lower noble metal film layer. Also, 0 to 20 wt % of PbO may be added to the composition.

The insulating noble metal decorating matter of the dual structure having the above-described frit layer, according to the present invention, is particularly excellent in color-developing (coloration) properties of the gold or silver noble metal color.

The components $Li_2O$, MgO, $ZrO_2$ and $P_2O_5$ may be increased or decreased within the above range for optionally adjusting the coloration of the decorating matter from lustrous to matted states. For example, if the amount of these components is minor, the coloration is lustrous, whereas, if the amount is larger, the coloration becomes matted. On the other hand, if the range of the composition of the present invention is exceeded, the color tone proper to the lower noble metal film layer tends to be impaired.

If the sum of the amounts of the components $Na_2O$, $K_2O$ and CaO is less than 6 wt %, the frit becomes poor in fusibility and coloration. If the sum exceeds the above range, coloration is improved due to increased transparency of the glass. However, the frit layer becomes weaker against thermal sock in the electronic range such that cracks are produced.

If the amounts for $Al_2O_3$ and $SiO_2$ are lesser than the above-mentioned ranges of the present invention, chemical resistance is lowered. Conversely, if these amounts are larger than the ranges of the present invention, fusibility and coloration are lowered. If PbO is added in an amount larger than the range of the present invention, coloration is lowered.

The frit layer of the present invention having the desired characteristics may be produced by preparing the composition within the above-mentioned range. Table 1 shows illustrative examples of the composition.

Refer to TABLE 1 at the end, wherein H, S and Soda represent as follows:

H=hard glaze (commercial "Noritake China")
S=soft glaze (commercial "Noritake Bone China")
Soda=soda glass (commercial plate glass).

For example, PbO as a low-temperature flux has the properties of lowering the yield point of the frit. The frit containing PbO thus may be fired at a lower temperature and hence is suited to decorating ceramic articles that cannot be fired at higher temperatures, such as soda glass.

It is also crucial to select the composition so that its thermal expansion coefficient will be closer to that of the body to be decorated for prohibiting defects, such as microcracks, from occurring. In general, it is MgO or $B_2O_3$ etc. that lowers the thermal expansion coefficient. On the other hand, if the amount of the alkali metal oxides is increased, the thermal expansion coefficient is increased. However, if a substantial amount of soda is replaced by potassium or lithium, the thermal expansion coefficient is lowered. Similarly, the frit layer having desired characteristic values of elasticity and tensile strength is commercially available in the above range.

As noble metals for the insulating overglaze decoration, employed in the method for producing the surface decorated article of the present invention, those commonly employed may be employed, on the condition that the noble metal film layer prepared exhibits electrical insulating properties.

However, for forming the noble metal decorating matter of a particularly light golden color tone, the following metallic composition is preferred for the golden component constituting the noble metal film layer.

That is, an insulating noble metal film layer having a compositiion of the golden components comprised of 60 to 90 wt % of Au, 3 to 15 wt % of Si, 2 to 11 wt % of In and 2 to 14 wt % of Ca, with the sum of the amounts of the components being 100 wt %, is preferred.

Regarding the composition of the golden components, Au is a pigment-like component for coloration in gold color. If the amount of Au is less than 60 wt %, coloration in gold color becomes insufficient. If it exceeds 90 wt %, electrical conductivity is undesirably induced in the noble metal film layer.

Si, In and Ca are components for rendering the noble metal film layer electrically non-conductive. Therefore, the more the amounts of Ca, In and Si, the more electrically non-conductive becomes the noble metal film layer. The amounts of these elements as specified above are required for compromising with coloration property. However, if the amount of the gold-colored component is within the range of the composition for the golden component of the present invention, the noble metal film layer formed exhibits sufficient insulating property. Thus, when exposed to high-frequency electro-magnetic waves radiated by the electronic range, the noble metal film layer and hence the noble metal decorating matter of the dual layer structure according to the present invention is not damaged.

The reason for employing the above numerical values of the electrically non-conductive components in the golden components in the noble metal film layer according to the present invention is explained. If Si is less than 3 wt %, the noble metal film layer becomes electrically conductive, whereas, if it exceeds 15 wt %, coloration in gold color becomes insufficient. If In is less than 2 wt %, the decorating matter becomes electrically conductive while becoming inferior in coloration in gold color. If In exceeds 11 wt %, coloration in gold color becomes inferior. If the amount of Ca is less than 2 wt %, coloration in gold color becomes inferior. If Ca is not added in the components of the noble metal film layer with the dual-layer structure of the noble metal decorating matter, the decorating matter is dark (or grayish) in color and thus inferior in coloration. Conversely, if the amount of Ca exceeds 14 wt %, cracking, for example, is produced, such that a smooth noble metal film layer cannot be produced.

In the insulating noble metal film, Rh and Bi can be further added to the gold-colored components. Addition of Rh leads to an increased film strength at 750° C. or higher. Addition of Bi gives a decorating matter having a light gold color tone and to an increased bonding strength with respect to the base material, such as ceramic wares, enamel wares etc. It is preferred to add 0.1 to 2 parts by weight of Rh to 100 parts by weight of the golden components, while it is preferred to add 1 to 10 parts by weight of Bi to 100 parts by weight of the golden components.

Similarly, for forming the noble metal decorating matter of particularly light silvery color tone, the noble metal film layer is preferably of such a composition in which at least one silvery component selected from among Ag, Pt and Pd is added in a defined amount to the above-mentioned golden components. The amount of addition of the silvery components is 0.5 to 5.0 parts by weight to 100 parts by weight of the golden components. If the amount of the silvery components is less than 0.5 part by weight or exceeds 5.0 parts by weight, the noble metal film is inferior in coloration in silver color.

In the noble metal film layer of the silvery color tone, it is similarly preferred to add Rh and Bi further for the same objective as in the noble metal film layer of the golden color tone. The amount of addition of Rh is preferably 0.1 to 2 parts by weight to 100 parts by weight of the golden component, while that of addition of Bi is preferably 1 to 10 parts by weight to 100 parts by weight of the golden component.

In the method for producing the surface-decorated article according to the present invention, a noble metal film layer superior in insulating and coloration properties can be formed by selective application of the liquid gold for overglaze decoration having the above metal composition to the noble metal for overglaze decoration. Conversely, the surface-decorated article obtained by employing the noble metal film layer having the above metal composition is particularly superior in coloration properties.

As for the metal component added in the liquid gold for insulating overglaze decoration according to the present invention, an organic compound of gold, for example, is employed as an Au component. As the organic compound of gold, gold resin balsam sulfide, gold mercaptide or the like, for example, is employed. As the Si, In and Ca components, metal powders, organic compounds or inorganic compounds of the components are employed. As the organic compounds of the respective components, resin acid salts of the respective components are preferably employed. These resin acid salts may be exemplified by silicon resin acid salts, indium resin acid salts or calcium resin acid salts.

As for further metal components added to the golden components, that is Rh and Bi, these may be preferably added as solutions of rhodium resin acid salts or bismuth resin acid salts.

As for Ag, Pt and Pd, added as silvery components, organic compounds of the respective components are preferably employed. The organic compounds of the respective components may be exemplified, e.g., by resin acid salts of the respective metals, that is silver resin acid salts, platinum resin acid salts or palladium resin acid salts.

The noble metal film layer, however, has to be fired at a temperature not higher than the melting temperature and softening temperature of the glaze or the substrate material of the ceramic articles as the body to be decorated. Therefore, if the body to be decorated is of a material in need of firing at a lower temperature, such as soda glass, it is necessary to select an organic compound with the respective metal compounds having a decomposition end temperature lower than the softening melting temperature of the body to be decorated, such as mercaptides.

The liquid gold for overglaze decoration for golden or silvery decoration is comprised of the golden components, silvery components if required, and a slurry-forming liquid. The slurry-forming liquid may be any of those commonly employed and is mainly composed of a resin solution and a solvent.

The components of the liquid gold for insulating overglaze decoration according to the present invention other than the metal components may be similar to those employed in the conventional technique insofar as the metal components are within the above-mentioned range of the present invention. Most commonly, resin balsam and turpentine oil are selected and mixed preferably at a weight ratio of approximately 60:40.

The amount of addition of the slurry-forming solution, which differs with the method of coating the liquid gold, may be up to about 10 to 40 wt % based on the total weight of liquid gold. If brushing is used for coating, about 15 to 35 wt % of the slurry-forming solution may be added to the total weight of the liquid gold for achieving the solution exhibiting a viscosity desirable in workability.

As for the gold content in weight percentage in the liquid gold for insulating overglaze decoration, it is desirable to add the slurry-forming solution in amounts of about 25 to 35 wt %, 20 to 25 wt % and 15 to 20 wt % for the gold amounts of about 5 to 8 wt %, 8 to 11 wt %, and about 11 to 13 wt % of the gold amounts, respectively.

EXAMPLES

The present invention will be further explained with reference to Examples which are merely illustrative and are not given for limiting the invention. In the following, percents % stand for weight percent, unless otherwise specified.

Examples 1 to 15

(1) Liquid gold samples for overglaze decoration having the metal compositions shown in Table 2 were prepared. For preparing the liquid gold samples for overglaze decoration of the respective Examples, gold resin balsam sulfide, calcium resin acid salts, indium resin acid salts, silicon resin acid salts, silver resin acid salts, platinum resin acid salts and palladium resin acid salts were dissolved in turpentine oil.

Refer to TABLE 2 at the end.

In this manner, an Au resin balsam sulfide solution containing 25% of Au, an indium resin acid salt solution containing 5% of In, a silicon resin acid solution containing 20% of Si, a calcium resin acid salt solution containing 5% of Ca, a silver resin acid salt solution containing 10% of Ag, a platinum resin acid salt solution containing 10% of Pt, and a palladium resin acid salt solution containing 10% of Pd were prepared and employed.

On the other hand, the resin balsam and turpentine oil were mixed at a ratio of 60:40 to form a slurry-forming solution which was added in a amount of 20% based on the total weight of liquid gold.

(2) The liquid gold samples prepared as described above were applied by brushing on glass or ceramic ware cups and printed at 500 to 900° C. for forming noble metal films presenting a gold or silver color.

(3) Frit components having compositions shown in table 1 were mixed with the same quantity in weight ratio of turpentine oil to form frit solutions which were applied by brushing on the noble metal film of (2) above to a thickness of 25 μm. The resulting assemblies were fired at 500 to 900° C.

(4) The decorating matter samples produced as described above were tested for electrical conductivity using a current tester.

It was thus found that none of the decorating matter samples exhibited electrical conductivity.

(5) The glass or ceramic ware cups, on which the decorating matter samples have been formed, were placed into an electronic range and tested.

The results of the test indicated that none of the decorating matter samples, exposed to high-frequency electro-magnetic waves radiated by the electronic range, produced sparks, cracking or peeling off. The decorating matter samples were not changed in color tone and maintained the light gold or silver color tone.

Tests for Evaluating Properties

Further detailed evaluation of the properties was conducted on the decorating matter samples obtained in the above Examples. The evaluation tests were conducted with respect to liability to damage, resistance against chemicals, resistance against abrasion wear and coloration properties (as explained later on). The results are shown in Table 3.

Refer to TABLE 3 at the end.

The samples according to the present invention were found to be acceptable in all items of the evaluation of the properties. In particular, the frit layers having specified compositions (Examples 1 to 6 and 11 to 15) exhibited excellent coloration properties of a value 1.2 or higher.

It is seen from above that, since the insulating surface-decorating matter for the surface-decorated article produced in accordance with the method of the present invention has the dual-layer structure, it is not damaged on exposure to high-frequency electromagnetic waves radiated by an electronic range, while it is superior in resistance against chemicals and against abrasion. In addition, it has been demonstrated that, if the frit layer is of a particular composition, the golden or silvery decorating matter excellent in coloration properties may be formed.

The surface decorated articles having the noble metal decorated matter with the composition shown in Table 1 applied thereon by means similar to those shown in the respective Examples were also tested by a test for evaluating the properties, and excellent test results as shown in Table 4 could be obtained.

Refer to TABLE 4 at the end.

Comparative Examples 1 to 8

Liquid gold samples for overglaze decoration having metal compositions shown in Table 5 were prepared otherwise in the same way as in (1) of the above Examples. Using the liquid gold samples for overglaze decoration prepared in (1) above, the golden or silvery decorated matters were formed on the glass or ceramic ware cup surface in the same way as in (2) and (3) of the Examples.

Refer to TABLE 5 at the end.

The produced cups were tested for evaluating the properties in the same way as in Examples above. The test results are shown in Table 6.

Refer to TABLE 6 at the end.

In the tests for chemical durability in the Comparative Examples, peeling off of the decorated matter was observed in Comparative Examples 1 to 3 on immersion in a boiling alkaline solution. Although the decorating matter was not shown to be damaged in Comparative Example 4, it demonstrated electrical conductivity after immersion. In the test for abrasion wear, the decorating matter of Comparative Examples 1 to 4 demonstrated electrical conductivity after grinding with an abrasive paper. In the Comparative examples 5 to 8, the noble metal decorating matter was seen to be damaged in the tests for susceptibility to damages on exposure to high-frequency electromagnetic waves of an electronic range.

Thus it was found that the decorating matter having only the noble metal film layer cannot withstand prolonged use since its initial insulating properties are destroyed by chemical load and abrasion. On the other hand, if the noble metal film layer exhibited electrical conductivity, the decorating matter was damaged when exposed to the high-frequency electromagnetic waves even if the decorating matter had a dual layer structure comprised of the noble metal film layer and the frit layer.

Method of Evaluating and testing of Properties (Durability against High-frequency Electro-Magnetic Waves)

At an edge and at a mid portion within an electronic range were placed glass or ceramic ware cups, each having the above decorating matter formed thereon, tilted at angles of 1°, 3° and 5°. These angles were produced by varying the angles of the bottom surfaces of the glass or ceramic ware cups with respect to the bottom surface of the electronic range for avoiding the dead angle of the micro-waves. The high-frequency electromagnetic waves of 1240 MHz were radiated for one minute at an output of 500 w and subsequently the possible presence of damages to the decorating matter of the glass or ceramic ware was checked visually. The test cups were judged to be acceptable (OK) and unacceptable (NG) if no damages were observed and if damages were observed, respectively.

Chemical Durability

As for the chemical durability that is resistance against acids or alkalis, glass or ceramic ware cups, each having the decorating matter formed thereon, were immersed in respective chemicals under conditions shown in Table 7. The possible presence of the damages produced to the decorating matter was visually checked and scored with points. The evaluation was given comprehensively based upon the total number of the score points.

The points were "0", "0.5", "1", "2", "3" and "4" for an undamaged decorating matter sample, and decorating matter samples damaged by 0%, 12.5%, 25%, 50%, 75% and 100%, respectively. If the points for each item concerning the degree of damages of the respective samples was less than the criterion shown in Fig. 7, the samples were judged to be acceptable (OK). On the other hand, if the point for one or more items exceeded the criterion, the sample was judged to be unacceptable (NG).

Refer to TABLE 7 at the end.

After testing on resistance against alkalis, the decorating matter samples of the respective Examples were checked as to electrical non-conductivity using a current tester.

Resistance against Abrasion Wear

Using a rubber grindstone (#250, hardness of 75°), mounted on an abrasion wear tester, each decorating matter sample was ground under conditions of a load of 500 g and a number of revolutions of 55 rpm. The tested samples that demonstrated no damages after 100 or more grinding operations were judged to be acceptable (OK), while the test samples damaged by grinding operation of a number less than 100 were judged to be unacceptable (NG).

Each decorating matter sample was manually ground ten times using an abrasive (sand) paper #4000 and checked as to the electrical non-conductivity using a current tester.

Coloration Properties

The coloration (color developing) properties of the decorating matter samples were measured using a color difference meter (Type OFC-31 manufactured by NIPPON DEN-SHOKU KOGYO KK).

Effect of the Invention

The surface-decorated (ceramic) articles by noble metal, obtained by the method of the present invention, has the insulating noble metal decorating matter having a dual layer structure comprised of an insulating noble metal film layer and a frit layer, and hence is not damaged upon exposure to high-frequency electro-magnetic waves radiated by the electronic range. In addition, the surface-decorated ceramic articles by noble metal are superior in chemical durability and resistance against abrasion wear.

In addition, if the frit layer has a specified composition, a surface-decorated article having a beautiful golden or silvery color tone can be produced.

In addition, if the liquid gold for insulating overglaze decoration according to the present invention is employed in the producing method according to the present invention, it becomes possible to produce a noble metal film layer having not only sufficient insulating properties but also a light golden or silvery color so that the noble metal film decorating matter having an overlying frit layer also presents a light color tone.

Since the surface decorated article of the present invention is superior in chemical durability and resistance against abrasion wear, it remains to be electrically insulating for a prolonged period of time, while the decorating matter is not liable to be damaged even on prolonged use on an electronic range. In addition, the golden or silvery color tone is not faded such that the beautiful color is maintained for prolonged time.

It should be noted that modifications obvious in the art may be done without departing from the gist and scope of the invention as herein disclosed and defined by the appended claims.

What is claimed is:

1. A liquid gold for insulating overglaze decoration for golden colored decoration presenting a golden color tone upon firing, comprising of golden components having a composition of 60 to 90 wt % of Au, 3 to 15 wt % of Si, 2 to 11 wt % of In and 2 to 14 wt % of Ca, with the total amount being 100 wt %, and a slurry forming liquid.

2. The insulating liquid gold for overglaze decoration for golden colored decoration as defined in claim 1, wherein the insulating liquid gold further contains at least one metal selected from the group consisting of 0.1 to 2 parts by weight of Rh and 1 to 10 parts by weight of Bi based on 100 parts by weight of the golden components.

3. An insulating liquid gold for overglaze decoration presenting a silvery color tone upon firing, wherein it further contains silvery components in the liquid gold for overglaze decoration as defined in claim 1, characterized in that 0.5 to 5 parts by weight in total of at least one metal selected from the group consisting of Ag, Pt and Pd is contained as the silvery component based on 100 parts by weight of said metal composition of the golden component.

4. An insulating liquid gold for overglaze decoration presenting a silvery color tone upon firing, wherein it further contains silvery components in the liquid gold for overglaze decoration as defined in claim 2, characterized in that 0.5 to 5 parts by weight in total of at least one metal selected from the group consisting of Ag, Pt and Pd is contained as the silvery component based on 100 parts by weight of said metal composition of the golden component.

\* \* \* \* \*